United States Patent
Okamoto

(10) Patent No.: US 7,764,575 B2
(45) Date of Patent: Jul. 27, 2010

(54) TRACKING ERROR DETECTING METHOD, TRACKING ERROR DETECTING APPARATUS AND OPTICAL RECORDING AND REPRODUCING APPARATUS

(75) Inventor: Yoshiki Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 823 days.

(21) Appl. No.: 11/585,774

(22) Filed: Oct. 25, 2006

(65) Prior Publication Data
US 2007/0104051 A1 May 10, 2007

(30) Foreign Application Priority Data
Nov. 7, 2005 (JP) .............................. 2005-322600

(51) Int. Cl.
*G11B 7/08* (2006.01)
(52) U.S. Cl. ............................... 369/44.23; 369/44.41
(58) Field of Classification Search .................. None
See application file for complete search history.

(56) References Cited

U.S. PATENT DOCUMENTS

| 4,775,968 A | 10/1988 | Ohsato |
| 6,266,301 B1* | 7/2001 | Morimoto ................ 369/44.23 |
| 2004/0109396 A1* | 6/2004 | Nakano et al. ........... 369/44.25 |
| 2006/0104173 A1* | 5/2006 | Shibuya et al. .......... 369/44.37 |

FOREIGN PATENT DOCUMENTS

| JP | 61-190731 A | 8/1986 |
| JP | 4-34212 | 6/1992 |
| JP | 07-302436 A | 11/1995 |
| JP | 09-128789 A | 5/1997 |

OTHER PUBLICATIONS

Japanese Office Action issued Dec. 8, 2009 for corresponding Japanese Application No. 2005-322600.

* cited by examiner

*Primary Examiner*—Wayne R Young
*Assistant Examiner*—Brian Butcher
(74) *Attorney, Agent, or Firm*—Rader Fishman & Grauer PLLC

(57) ABSTRACT

A tracking error detecting method comprises the steps of causing intensity distributions of single light introduced into an objective lens to have symmetry with respect to the track direction of an optical recording medium and the direction oblique to the direction perpendicular to the track direction, dividing a light-receiving unit into at least light-receiving units of the track direction and light-receiving units of the direction perpendicular to the track direction and detecting a tracking error signal based on detection signals from the divided light-receiving units.

10 Claims, 5 Drawing Sheets b: RPP
c: k · TPP
d: TES (Tracking Error Signal)

TRACKING ERROR DETECTING METHOD, TRACKING ERROR DETECTING APPARATUS AND OPTICAL RECORDING AND REPRODUCING APPARATUS

CROSS REFERENCES TO RELATED APPLICATIONS

The present invention contains subject matter related to Japanese Patent Application JP 2005-322600 filed in the Japanese Patent Office on Nov. 7, 2005, the entire contents of which are incorporated herein by reference.

BACKGROUND OF THE INVENTION

1. Field of the Invention

The present invention relates to a tracking error detecting method, a tracking error detecting apparatus and an optical recording and reproducing apparatus for use in optically recording and reproducing information on and from an optical recording medium, such as an optical disc and an optical card.

2. Description of the Related Art

In recent years, various types of optical recording mediums with different recording densities have been developed. For example, a CD (Compact Disc) of which available wavelength of laser light is near 780 nm, for example, a DVD (Digital Versatile Disc) of which available wavelength of laser light is near 660 nm, a BD (Blu-ray Disc: Trademark) of which available wavelength of laser light is near 405 nm, and HD-DVD (High Definition DVD) of which available wavelength of laser light is near 405 nm might be enumerated as disc-like optical recording mediums.

These optical recording media are respectively different in structure. In order to increase recording density, a track pitch of 1.6 μm of a CD type optical recording medium is miniaturized as 0.74 μm in the DVD type optical recording medium, and it is also microminiaturized as approximately 0.3 to 0.35 μm in the BD-type optical recording medium.

With respect to the recording track of which track width is microminiaturized as described above, it is necessary to locate light emitted from a light source at target recording tracks with high accuracy.

A DPP (Differential Push-Pull) method is widely used as a method for correcting the offset of an objective lens, that is, the shift of an optical axis of the objective lens in a tracking method using a push-pull signal (see Cited Patent Reference 1, for example).

According to this DPP method, light traveling from the light source to the optical recording medium is divided into three lights, two sub-beams are irradiated on the position shifted by ½ of the track pitch of the recording track with high accuracy in the radial direction on the surface of the optical recording medium relative to the middle main beam, and the tracking error can be detected and the offset of the objective lens can be canceled by detecting these lights at the light-receiving units.

[Cited Patent Reference 1]: Japanese Examined Patent Publication No. H04-34212

SUMMARY OF THE INVENTION

As described above, in the tracking error detecting method according to the related-art DPP method, three divided lights on the outward light path of light traveling from the light source to the optical recording medium should be irradiated on target positions of the recording tracks of the optical recording medium with high accuracy. Then, it is unavoidable that the above-mentioned, related-art tracking error detecting method encounters the following problems:

(1) Since light is divided into three lights on the outward light path, the utilization factor of light from the light source is lowered in the optical recording and reproducing medium that can be recorded and reproduced as compared with the case in which light is not divided;

(2) Sub-beams should be located relative to the tracks of the optical recording medium with high accuracy;

(3) A main beam should be located on the seek axis (radial direction) of the optical recording medium with high accuracy;

(4) It is unavoidable that unnecessary lights from layers, which are not recorded and reproduced, in an optical recording and reproducing medium having a plurality of layers; and (5) The above-mentioned related-art tracking error detecting method is not compatible with an optical recording medium with different track pitches.

However, a method for correcting an offset of an objective lens with high accuracy without dividing light on the outward light path has not yet been proposed.

In view of the aforesaid aspects, the present invention intends to provide a tracking error detecting method, a tracking error detecting apparatus capable of correcting an offset of an objective lens in tracking error detection and an optical recording and reproducing apparatus using the above-mentioned tracking error detecting method and tracking error detecting apparatus.

According to an aspect of the present invention, there is provided a tracking error detecting method comprising the steps of causing intensity distributions of single light introduced into an objective lens to have symmetry with respect to the track direction of an optical recording medium and the direction oblique to the direction perpendicular to the track direction, dividing a light-receiving unit into at least light-receiving units of the track direction and light-receiving units of the direction perpendicular to the track direction and detecting a tracking error signal based on detection signals from the divided light-receiving units.

In the tracking error detecting method according to the present invention, the light-receiving unit detects a tracking error signal TES as:

$$TES = RPP - kTPP \text{ (k is an arbitrary constant)}$$

where TPP represents a difference signal of the track direction of the optical recording medium and RPP represents a difference signal of the direction perpendicular to the track direction.

In the tracking error detecting method according to the present invention, the direction in which lights introduced into the optical recording medium and the light-receiving unit has symmetry of intensity distributions is expressed as:

$$10 \text{ degrees} \leq \alpha \leq 80 \text{ degrees}$$

where α represents the angle formed between the directions and the track direction.

According to other aspect of the present invention, there is provided a tracking error detecting apparatus comprising an optical system in which single light from a light source is introduced through at least an objective lens into an optical recording medium, light reflected from the optical recording medium being introduced into a light-receiving unit and an arithmetic circuit for detecting at least a tracking error signal based on light outputs detected at the light-receiving unit. Therein, intensity distributions of light introduced into the objective lens have symmetry with respect to the track direction of the optical recording medium and the direction oblique to the direction perpendicular to the track direction, the light-receiving unit is divided into at least the track direction and the direction perpendicular to the track direction and the arithmetic circuit detects a tracking error signal based on detecting signals from the divided light-receiving units.

In the tracking error detecting apparatus according to the present invention, the light-receiving unit detects a tracking error signal TES as:

TES=RPP−kTPP (k is an arbitrary constant)

where TPP represents a difference signal of the track direction of the optical recording medium and RPP represents a difference signal of the direction perpendicular to the track direction.

In the tracking error detecting apparatus according to the present invention, the direction in which lights introduced into the optical recording medium and the light-receiving unit has symmetry of intensity distributions is expressed as:

10 degrees≦α≦80 degrees where α represents the angle formed between the direction and the track direction.

In accordance with a further aspect of the present invention, there is provided an optical recording and reproducing apparatus including an optical head composed of an optical system in which single light from a light source is introduced through an objective lens into an optical recording medium, light reflected from the optical recording medium being introduced into a light-receiving unit and an objective lens driving unit for driving the objective lens, and the optical head for recording and/or reproducing information based on light outputs detected by the light-receiving unit. Therein, intensity distributions of light introduced into the objective lens have symmetry with respect to the track direction of the optical recording medium and the direction oblique to the direction perpendicular to the track direction, the light-receiving unit is divided into at least the track direction and the direction perpendicular to the track direction and an arithmetic circuit calculates a tracking error signal based on detecting signals from the divided light-receiving units.

In the optical recording and reproducing apparatus according to the present invention, the light-receiving unit detects a tracking error signal TES as:

TES=RPP−kTPP (k is an arbitrary constant)

where TPP represents a difference signal of the track direction of the optical recording medium and RPP represents a difference signal of the direction perpendicular to the track direction.

In the optical recording and reproducing apparatus according to the present invention, the direction in which lights introduced into the optical recording medium and the light-receiving unit has symmetry of intensity distributions is expressed as:

10 degrees≦α≦80 degrees where α represents the angle formed between the direction and the track direction.

In the optical recording and reproducing apparatus according to the present invention, the difference signal TPP of the track direction corresponds to an amount in which the objective lens is shifted in the direction perpendicular to the track direction.

DESCRIPTION OF THE PREFERRED EMBODIMENTS

Embodiments of the present invention will be described below with reference to the drawings, but it is needless to say that the present invention is not limited to the embodiments which will follow.

Figure 1:
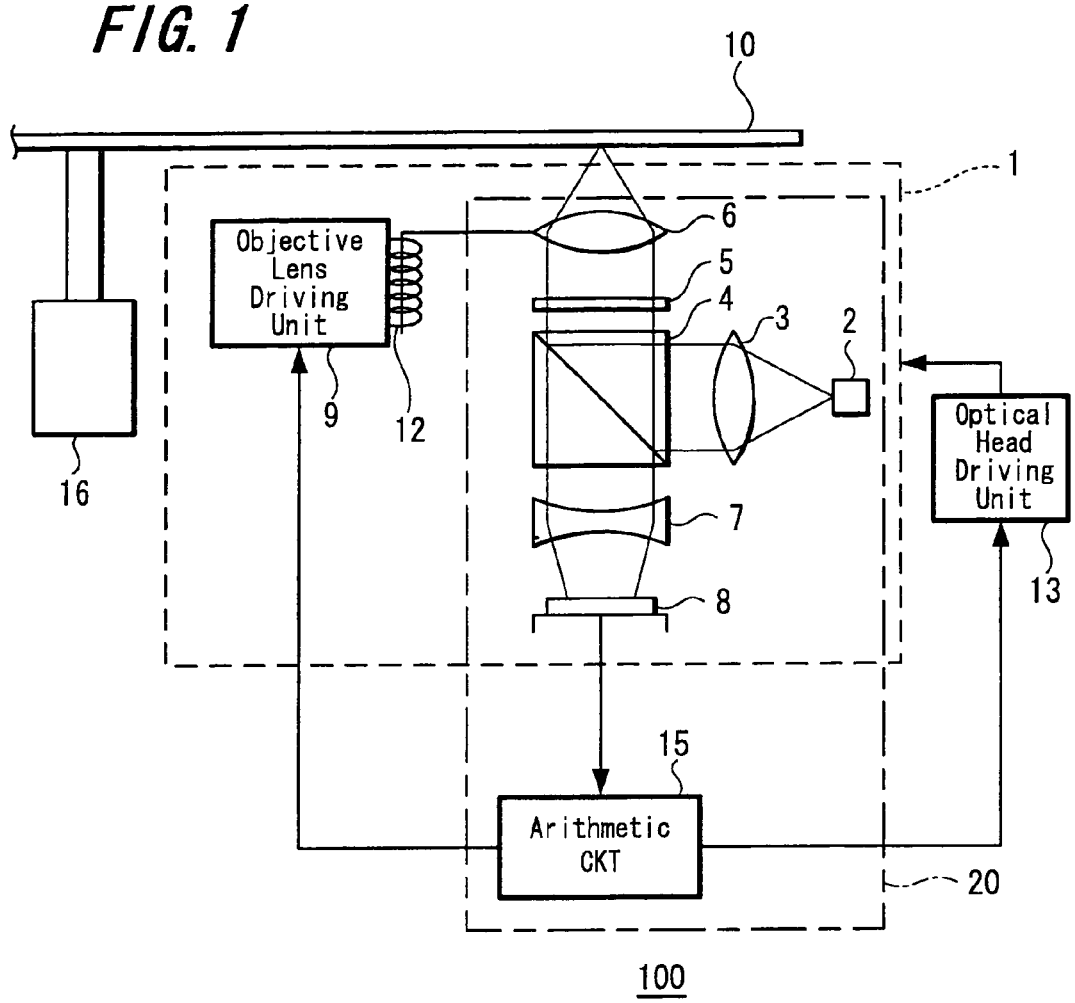
FIG. 1 is a schematic block diagram showing an optical recording and reproducing apparatus including a tracking error detecting apparatus according to an embodiment of the present invention.

FIG. 1 of the accompanying drawings is a schematic block diagram showing main portions of an example of an optical recording and reproducing apparatus including a tracking error detecting apparatus which can realize a tracking error detecting method according to the present invention.

An optical recording and reproducing apparatus, generally depicted by reference numeral 100 in FIG. 1, includes a light source 2 composed a suitable device such as a semiconductor laser and an optical system for introducing light emitted from the light source 2 into an optical recording medium 10, for example, an optical disc. As shown in FIG. 1, this optical system is composed of a lens 3 made of a suitable lens, such as a collimator lens, in this case, a polarizing beam splitter 4, a quarter-wave plate 5 and an objective lens 6. Also, the optical recording and reproducing apparatus 100 further includes an optical system for introducing light reflected on the optical recording medium 10 into a light-receiving portion 8. In this case, this optical system is composed of an objective lens 6, the quarter-wave plate 5, the polarizing beam splitter 4 and a lens 7 formed of a suitable lens, such as a multi-lens.

An objective lens driving unit 9, such as a biaxial actuator, is connected to the objective lens 6 to configure an optical head 1 shown by a broken line. Also, the optical recording medium 10 is fixedly held on a rotary driving unit 16, and it is rotated at a predetermined speed upon recording and reproducing.

A signal detected by the light-receiving unit 8 is outputted to the arithmetic circuit 15. As shown by a dot-and-dash line T in FIG. 1, a tracking error detecting apparatus 20 according to the present invention includes an optical system for introducing light from the light source 2 into the optical recording medium 10, an optical system for introducing light reflected on the optical recording medium 10 into the light-receiving unit 8 and an arithmetic circuit 15.

In this arrangement, laser light, for example, emitted from the light source 2 is collimated as parallel light by the lens 3 formed of a collimator lens, for example. Then, this parallel light is introduced into the polarizing beam splitter 4, in which it is reflected on the plane of polarization, passed through the quarter-wave plate 5 and introduced through the objective lens 6 onto a predetermined recording track of the optical recording medium 10.

This light is converted into a light beam with a light intensity distribution, which will be described in detail later on with reference to FIGS. 2A and 2B, introduced into the objective lens 6 and irradiated on predetermined tracks of the optical recording medium 10 with a predetermined light intensity distribution.

The light reflected from the optical recording medium 10 is passed through the quarter-wave plate 5 from the objective lens 6. Light that has passed the quarter-wave plate 5 twice is converted in the polarizing direction by the polarizing beam splitter 4, passed through the plane of polarization and introduced through the lens 7 onto the light-receiving surface of the light-receiving unit 8.

This light-receiving unit 8 is divided into four portions in the track direction of the optical recording medium 10 and in the direction perpendicular to the track direction. Specifically, when the optical recording medium 10 is a disc-like optical disc, the light-receiving unit 8 is divided into four portions in the directions corresponding to the tangential (tangential line) direction and a radial (radius) direction. It should be noted that the light-receiving unit 8 is located in such a manner that intersection points of divided lines of the light-receiving unit may be in agreement with intensity centers of intensity distributions of light introduced into the light-receiving unit 8 after the light reflected from the optical recording medium 10.

Then, light outputs detected by the light-receiving unit 8 is supplied to the arithmetic circuit 15, and thereby an RF (radio frequency) signal, a TE (tracking error) signal and an FE (focus error) signal are computed, respectively. A sum signal of light outputs detected by the light-receiving unit 8, for example, is supplied to the arithmetic circuit 15, in which it is processed by suitable processing methods, such as A/D (analog-to-digital) conversion and error-correction and thereby the RF signal is outputted as a recording and reproducing signal. The tracking error (TE) signal is outputted to the optical head driving unit 13 and/or objective lens driving unit 9, and thereby the optical head driving unit 13 and/or objective lens driving unit 9 is controlled under tracking servo. Also, a focus error (FE) signal is outputted to the objective lens driving unit 9 and thereby the objective lens driving unit 9, is controlled under focusing servo.

It should be noted that the focusing error (FE) signal can be detected by an astigmatism method by supplying astigmatism to the lens 7 formed of the multi-lens, for example.

Figure 2A:
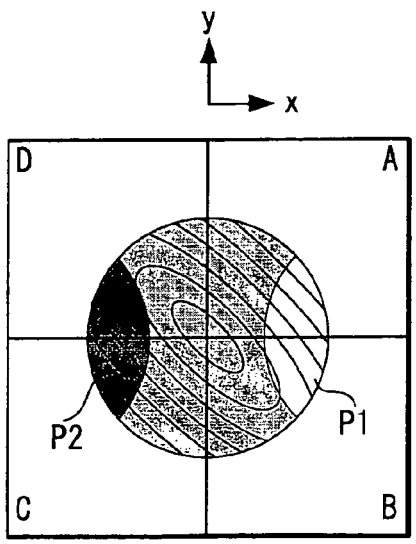
FIGS. 2A and 2B are diagrams to which reference will be made in explaining a tracking error detecting method according to an embodiment of the present invention.
Figure 2B:
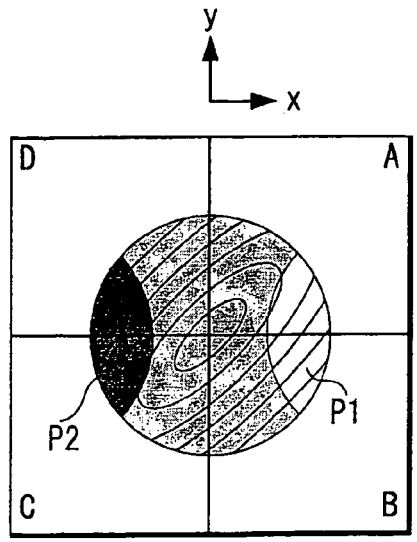

Then, according to the present invention, as shown in FIG. 2A or 2B, light introduced into the objective lens 6 may have symmetry in light intensity distribution in the track direction and the direction slanting to the direction perpendicular to the track direction and light emitted from the light source 2 may have symmetry in light intensity distribution. Specifically, on the surface of the optical recording medium 10, and also similarly in the light-receiving unit 8, the light intensity distribution may have symmetry in the track direction of the optical recording medium 10 and in the direction slanting to the direction corresponding to the direction perpendicular to the track direction.

Here, as shown in FIGS. 2A and 2B, on the light-receiving surface of the light-receiving unit 8, assuming now that the direction corresponding to the track direction (tangential direction) of the optical recording medium 10 is an y-axis and that the direction corresponding to the direction (radial direction) perpendicular to the y-axis is an x-axis, A assumes a signal obtained from a light-receiving area of x>0 and y>0 of the x-y coordinates system. Further, B assumes a signal obtained from a light-receiving area of x<0 and y>0, C assumes a signal obtained from a light-receiving area of x<0 and y<0 and D assumes a signal obtained from a light-receiving area of x>0 and y<0.

FIG. 2A shows the cases in which the light intensity distribution is dense in the areas to receive the signals A and C and in which the light intensity distribution becomes thin in the areas to receive the signals B and D. FIG. 2B shows the cases in which the light intensity distribution is dense in the areas to receive the signals B and D and in which the light intensity distribution is thin in the areas to receive the signal A and C. More specifically, according to the present invention, as shown in FIGS. 2A and 2B, light is introduced into the objective lens 6 in such a manner that the light intensity distribution may have symmetry in the directions oblique to the x-axis and the y-axis.

In FIGS. 2A and 2B, reference numerals P1 and P2 denote push-pull signal areas in which 0-th order diffracted light and ±1st order diffracted lights diffracted by track guide grooves or concave and convex pits are overlapping with each other.

It should be noted that a semiconductor laser available as a light source of an optical recording and reproducing apparatus has generally different angles at which light diverges in the direction parallel to the active layer (// direction) and in the direction vertical to the active layer (⊥). The angle at which light diverges in the ⊥ direction relative to the active layer is several times as large as the angle at which light diverges in the // direction relative to the active layer. For this reason, as long as light is not processed by a suitable method such as beam shaping, the light intensity distribution obtained when light is introduced into the objective lens has a high intensity of peripheral light (rim intensity) in the ⊥ direction and a low intensity of peripheral light in the // direction.

Accordingly, if this light intensity distribution is located in such a manner that the light intensity distribution may have symmetry in the direction oblique to the track direction (tangential direction) of the optical recording medium, that is, the direction oblique to the track direction, then when the objective lens is offset in the direction perpendicular to the track (radial direction), it is possible to detect the thus offset lens shift amount and tracking error signal based on detected signals from the quadrant light-receiving units.

A principle to detect this objective lens shift amount will be described with reference to FIGS. 3 and 4.

Figure 3:
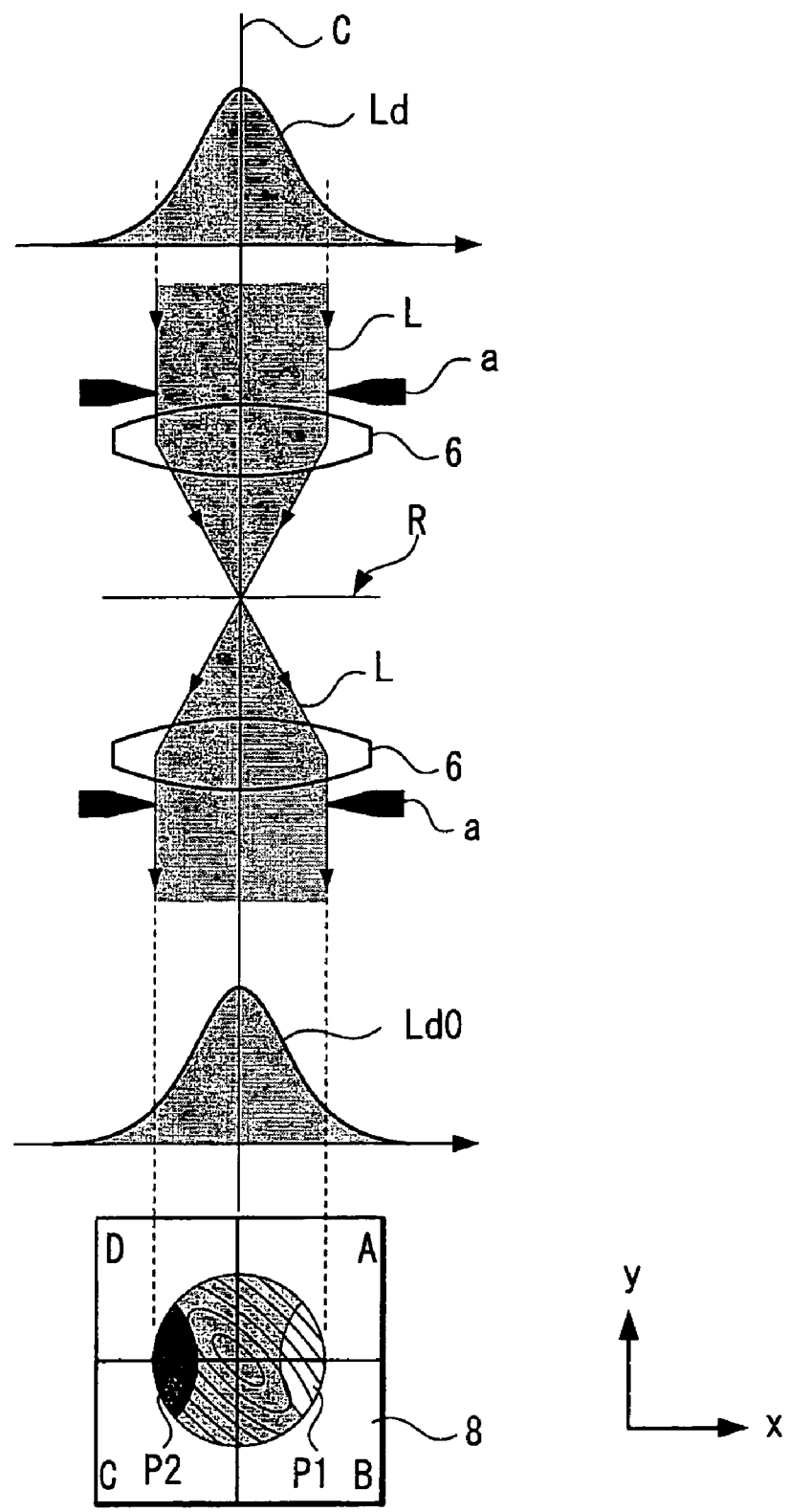
FIG. 3 is a diagram to which reference will be made in explaining a tracking error detecting method according to an embodiment of the present invention.
Figure 4:
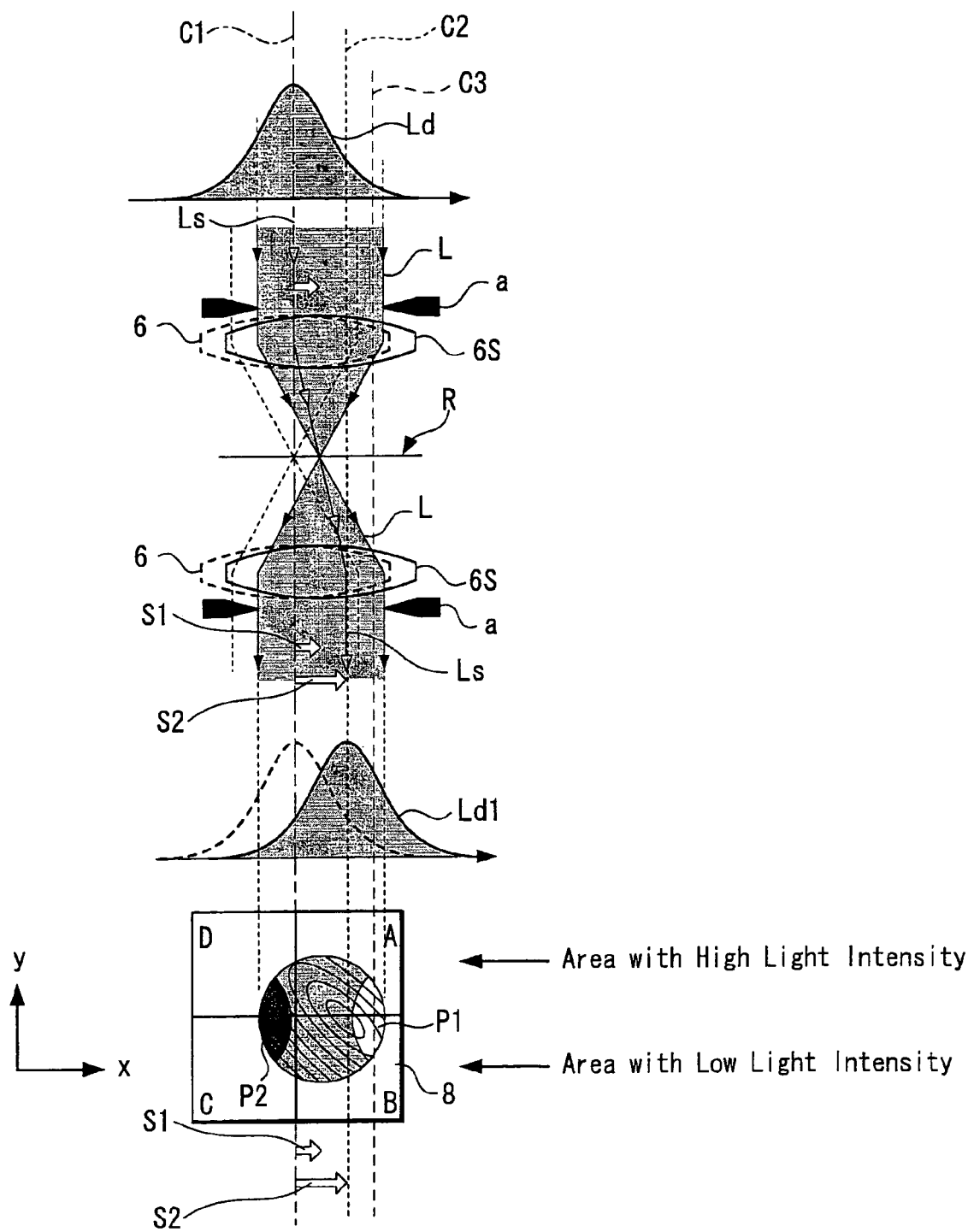
FIG. 4 is a diagram to which reference will be made in explaining a tracking error detecting method according to an embodiment of the present invention.

FIGS. 3 and 4 show light intensity distributions of light incident on the objective lens, light path diagrams in which the light path of light reflected on the surface of the optical recording medium by the objective lens is replaced with a transmission light path and light intensity distributions on the surface of the light-receiving unit and intensity distribution plan views on the light-receiving unit. FIGS. 3 and 4 show the cases in which the objective lens is located on the optical axis and the cases in which the objective lens is lens-shifted by a shift amount S1. Also, the light-receiving unit 8 shown in FIGS. 3 and 4, elements and parts identical to those of FIGS. 2A and 2B are denoted by identical reference numerals and therefore need not be described.

As shown in FIG. 3, when the optical axis C of the objective lens 6 is not shifted, a light intensity distribution Ld becomes a light intensity distribution of which axis of symmetry is the optical axis C, the incident light L controlled by an aperture a has a light intensity distribution Ld0 whose axis of symmetry is the optical axis C after it is reflected on a reflection surface R, and accordingly, an intensity distribution can be maintained when light is introduced into the light-receiving portion 8 with the aforementioned light intensity distribution shown in FIG. 2A. At that time, light intensity distributions in the upper and lower areas divided by the x-axis, which indicates the direction (radial direction) perpendicular to the track direction of the optical recording medium, are symmetric to each other, that is, signals (A+D) and (B+C) become substantially equal to each other, and this difference signal of the signals (A+D) and (B+C) becomes zero.

On the other hand, as shown in FIG. 4, when an optical axis C2 of the objective lens 6 is shifted relative to the optical axis C1 of the optical system, if the objective lens shift amount is represented as S1, then in a light intensity distribution of light reflected on the reflection surface R, a light intensity distribution Ld1 is shifted by a shift amount S2 twice as large as the shift amount S1 of the objective lens 6 after it was passed through the objective lens 6 in the returned light path (shown as a transmission light path in FIG. 4). Specifically, the light-receiving unit 8 receives the light intensity distribution as a light intensity distribution whose apex is located at the position shown by a broken line C3, that is, the light intensity distribution shifted by the shift amount S2 twice as large as the shift amount S1 of the objective lens 6. In FIG. 4, a light path of light on the optical axis C1 of the optical system is shown by an arrow Ls.

In this case, since a light intensity difference is generated in the direction (radial direction) perpendicular to the track direction of the optical recording medium by the shift of the objective lens, particularly in this embodiment, since this light intensity distribution is inclined, a light intensity difference is also generated in the track direction (tangential direction). As a result, the + side area of the y-axis of the light-receiving unit 8 becomes an area in which light intensity is high and the − side area of the y-axis becomes an area in which light intensity is low.

Accordingly, it becomes possible to detect only the offset (shift amount) of the objective lens 6 by detecting a difference signal (A+B)−(C+D) that is a light intensity difference between the upper and lower areas of the light-receiving unit 8 shown in FIG. 4. Also, it is possible to obtain a tracking error signal in which the offset of the objective lens 6 was corrected by subtracting a difference signal indicative of this shift amount from the difference signal of the direction (radial direction) perpendicular to the track.

Specifically, in this case, the tracking error signal TES can be expressed as:

$$TES = RPP - kTPP \text{ (k is an arbitrary constant)} \quad (1)$$

where RPP represents the difference signal of the direction (radial direction) perpendicular to the track and TPP represents the difference signal of the track direction. RPP can be expressed as:

$$RPP = (A+B) - (C+D) \quad (2)$$

Also, as shown in FIG. 2A, when the light intensity distribution of light incident on the objective lens 6 is dense in the areas to receive the signals A and C of the light-receiving units and it is thin in the areas to receive the signals B and D from the light-receiving units, TPP can be expressed as:

$$TPP = (A+D) - (B+C) \quad (3)$$

Also, as shown in FIG. 2B, when the light intensity of light incident on the objective lens 6 is thin in the areas to receive the signals A and C of the light-receiving units and it is dense in the areas to receive the signals B and D from the light-receiving units, TPP can be expressed as:

$$TPP = (B+C) - (A+D) \quad (3')$$

It should be noted that the arbitrary constant k is a correction coefficient to correct differences caused by different intensity distributions of incident light and angles of inclination.

Figure 5:
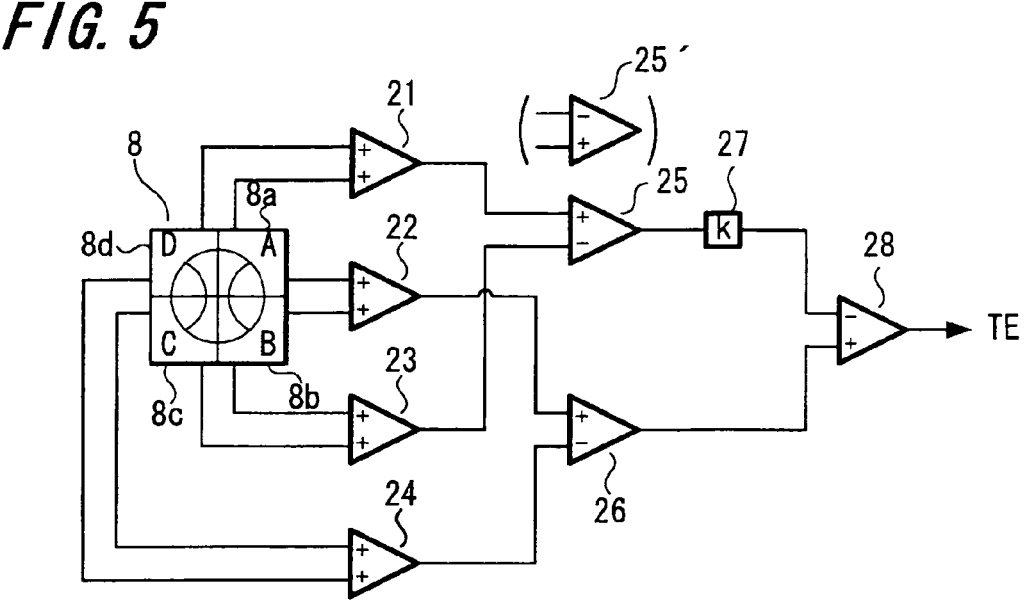
FIG. 5 is a schematic block diagram showing an arithmetic circuit of the tracking error detecting apparatus according to an embodiment of the present invention.

FIG. 5 is a schematic block diagram showing the arithmetic circuit 15 for calculating the above-described equations (1) to (3) (or (3')).

As shown in FIG. 5, light amounts A to D detected by the light-receiving unit 8 are calculated as A+D, A+B, B+C and C+D by adders 21 to 24, respectively, and these light amounts A to D are calculated as (A+D)−(B+C), that is, TPP and (A+B)−(C+D), that is, RPP by subtracters 25 and 26, respectively. It should be noted that, when the above-described equation (3') is calculated, (B+C)−(A+D) is calculated by a subtracter 25'. Then, further, TPP is multiplied with the coefficient k by a coefficient multiplier 27 and a difference signal between RPP and kTTP is outputted from an adder 28 as the tracking error signal TES.

Figure 6:
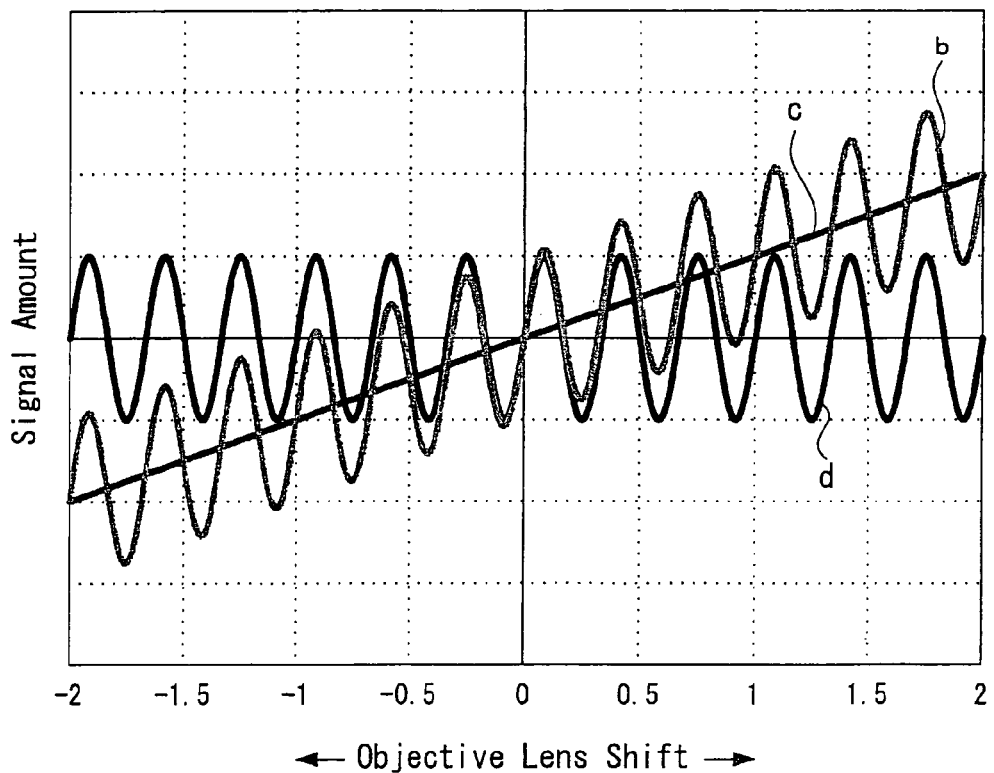
FIG. 6 is a diagram showing a tracking error detecting signal relative to shifts of an objective lens.

According to this calculation, a DC component kTPP, shown by a solid line c, added to a tracking error signal RPP, shown by a solid line b, by the offset of the objective lens 6 in the related art can be corrected and hence only the original tracking error signal component TES shown by a solid line d can be detected. In FIG. 6, a signal amount is given as a relative value.

It should be noted that, although not shown, the above-mentioned RF signal can be detected by calculation of (A+B+C+D) and a focus error signal using the astigmatism method can be detected by calculation of (A+C)−(B+D).

Figure 7:
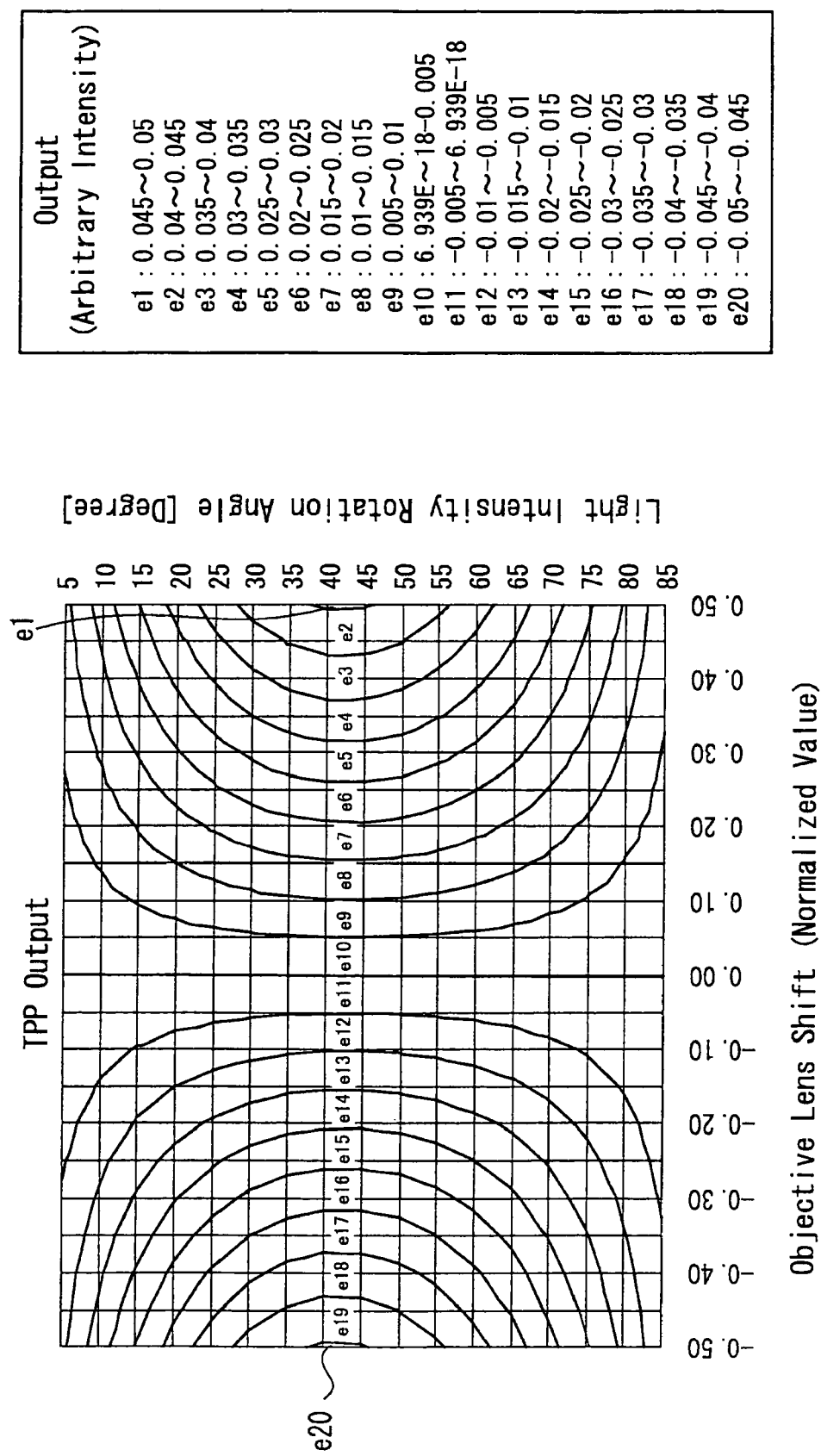
FIG. 7 is a diagram showing a manner in which a tracking error signal is changed when an inclination angle of a light intensity distribution and an objective lens shift are changed.

FIG. 7 is a diagram showing results obtained when the TPP output was simulated while the angle of inclination of the intensity distribution of light incident on the objective lens 6 was being varied in a range of from 5 degrees to 85 degrees from the x-axis shown in FIG. 2C, that is, the direction (radial direction) perpendicular to the track direction. In this simulation, the intensity of peripheral light in the wide light intensity distribution is selected to be 0.88 and the intensity of peripheral light in the narrow light intensity distribution is selected to be 0.49. Also, the objective lens shift amount of the horizontal axis is shown as a standardized value where the aperture radius is selected to be 1. The TPP output value is an arbitrary intensity.

As will be clear from FIG. 7, it is to be understood that, when the symmetry direction of the light intensity distribution is located with angles of inclination, since output differences of sufficient level can be detected relative to the objective lens shift amount in a range in which the angle of inclination lies between 10 degrees and 80 degrees, the angle of inclination should be selected in a range of from 10 degrees to 80 degrees.

Also, in order to detect the objective lens shift amount with higher accuracy, it is desirable that the angle of inclination should be selected in a range of from approximately 30 degrees to 60 degrees. In particular, if the angle of inclination is selected in a range of from 40 degrees to 45 degrees, then since it is possible to detect a largest signal output difference, it is to be understood that the angle of inclination should be desirably selected in the above-mentioned range.

According to the above-mentioned tracking error detecting method, tracking error detecting apparatus and optical recording and reproducing apparatus of the present invention, it is possible to correct the offset of the objective lens by only one beam without using sub-beams, that is, it is possible to easily obtain a tracking error signal with the offset being removed by an optical system of a relatively simple arrangement even though the objective lens is shifted from the optical system. Also, since the optical system for detecting a tracking error can be configured by only one beam, the following effects can be achieved:

1. The utilization factor of light can be improved.
2. Optical axis alignment of the optical system, beam position alignment and position alignment accuracy of the beam moving direction can be moderated so that the assembly process can be simplified, productivity can be improved and a yield can be increased.
3. Since a plurality of beams need not be used, it is possible to suppress and decrease the occurrence of unnecessary tracking errors, when information is recorded on and reproduced from an optical recording medium having a plurality of recording layers.
4. It is possible to obtain compatibility with optical recording media having different track pitches.

It should be noted that the tracking error detecting apparatus and the optical recording and reproducing apparatus according to the present invention are not limited to the embodiments explained in the above-mentioned embodiments and they can be variously modified and varied without departing from the scope of the arrangements of the present invention.

For example, in the optical recording and reproducing apparatus according to the present invention, the focus error detecting method is not limited to the above-mentioned astigmatism and other methods can be used.

Also, the tracking error detecting method, the tracking error detecting apparatus and the optical recording and reproducing apparatus according to the present invention can be applied to the case in which information is recorded on and reproduced from optical recording media, including various kinds of guide grooves and uneven pits, such as a dye-based optical disc, a phase-change type optical disc and a magneto-optical disc except optical recording mediums, using specific push-pull detection systems, such as a DVD-ROM (digital versatile disc-read only memory). Furthermore, it should be noted that the present invention can be applied to all optical recording mediums when only offset of the objective lens is detected.

It should be understood by those skilled in the art that various modifications, combinations, subcombinations and alterations may occur depending on design requirements and other factors insofar as they are within the scope of the appended claims or the equivalents thereof.

What is claimed is:

1. A tracking error detecting method comprising the steps of:
    causing an intensity distribution of a single light introduced into an objective lens to have symmetry with respect to an oblique direction, which is oblique to a track direction of an optical recording medium, and a direction perpendicular to said track direction, before said single light having said intensity distribution is irradiated on said optical recording medium;
    irradiating said single light having said intensity distribution on said optical recording medium;
    detecting a reflection light, which is a reflection of the single light from the optical recording medium, by a light-receiving unit having first and second groups of light receiving sections, which are arranged in said track direction, and having third and fourth groups of light receiving sections, which are arranged in said direction perpendicular to said track direction; and
    detecting a tracking error signal based on difference between a sum of signals from said first group of light receiving sections and a sum of signals from said second group of light receiving sections, and difference between a sum of signals from said third group of light receiving sections and a sum of signals from said fourth group of light receiving sections.

2. The tracking error detecting method according to claim 1, wherein when said tracking error signal is represented as TES, said light-receiving unit detects said tracking error signal TES as:

$$TES = RPP - kTPP \text{ (k is an arbitrary constant)}$$

where TPP represents a difference signal representing said difference between a sum of signals from said first group of light receiving sections and a sum of signals from said second group of light receiving sections and RPP represents a difference signal representing said difference between a sum of signals from said third group of light receiving sections and a sum of signals from said fourth group of light receiving sections.

3. The tracking error detecting method according to claim 1, wherein an inclination angle $\alpha$ of said oblique direction with respect to said direction perpendicular to said track direction is in a range of 10 degrees $\leq \alpha \leq$ 80 degrees.

4. A tracking error detecting apparatus comprising:
    an optical system in which a single light from a light source is introduced through at least an objective lens into an optical recording medium, the single light reflected from said optical recording medium being introduced into a light-receiving unit having first and second groups of light receiving sections, which are arranged in a track direction and having third and fourth groups of light receiving sections, which are arranged in a direction perpendicular to said track direction; and
    an arithmetic circuit for detecting at least a tracking error signal based on light outputs detected at said light-receiving unit,
    wherein an intensity distribution of the single light introduced into said objective lens has symmetry with respect to an oblique direction which is oblique to said track direction of said optical recording medium and said direction perpendicular to said track direction,
    said arithmetic circuit detects said tracking error signal based on difference between a sum of signals from said first group of light receiving sections and a sum of signals from said second group of light receiving sections, and difference between a sum of signals from said third group of light receiving sections and a sum of signals from said fourth group of light receiving sections.

5. The tracking error detecting apparatus according to claim 4, wherein when said tracking error signal is represented as TES, said light-receiving unit detects said tracking error signal TES as:

$$TES = RPP - kTPP \text{ (k is an arbitrary constant)}$$

where TPP represents a difference signal representing said difference between a sum of signals from said first group of light receiving sections and a sum of signals from said second group of light receiving sections, and RPP represents a difference signal representing said difference between a sum of signals from said third group of light receiving sections and a sum of signals from said fourth group of light receiving sections.

6. The tracking error detecting apparatus according to claim 4, wherein an inclination angle $\alpha$ of said oblique direction with respect to said direction perpendicular to said track direction is in a range of 10 degrees≦α≦80 degrees.

7. An optical recording and reproducing apparatus comprising:

an optical head composed of an optical system in which a single light from a light source is introduced through an objective lens into an optical recording medium, the single light reflected from said optical recording medium being introduced into a light-receiving unit having first and second groups of light receiving sections, which are arranged in a track direction and having third and fourth groups of light receiving sections, in each of which said light receiving sections are arranged in a direction perpendicular to said track direction, and an objective lens driving unit for driving said objective lens, said optical head for recording and/or reproducing information based on light outputs detected by said light-receiving unit, wherein an intensity distribution of the single light introduced into said objective lens have has symmetry with respect to an oblique direction which is oblique to a track direction of said optical recording medium and a direction perpendicular to said track direction; and an arithmetic circuit calculates a tracking error signal based on difference between a sum of signals from said first group of light receiving sections and a sum of signals from said second group of light receiving sections, and difference between a sum of signals from said third group of light receiving sections and a sum of signals from said fourth group of light receiving sections.

8. The optical recording and reproducing apparatus according to claim 7, wherein when said tracking error signal is represented as TES, said light-receiving unit detects said tracking error signal TES as:

$$TES = RPP - kTPP \text{ (k is an arbitrary constant)}$$

where TPP represents a difference signal representing said difference between a sum of signals from said first group of light receiving sections and a sum of signals from said second group of light receiving sections, and RPP represents a difference signal representing said difference between a sum of signals from said third group of light receiving sections and a sum of signals from said fourth group of light receiving sections.

9. The optical recording and reproducing apparatus according to claim 7, wherein an inclination angle α of the oblique direction with respect to said direction perpendicular to the track direction is in a range of 10 degrees≦α≦80 degrees.

10. The optical recording and reproducing apparatus according to claim 8, wherein said difference signal TPP of said track direction corresponds to an amount in which said objective lens is shifted in the direction perpendicular to the track direction.

* * * * *